United States Patent [19]
Vickers

[11] Patent Number: 4,495,500
[45] Date of Patent: Jan. 22, 1985

[54] TOPOGRAPHIC DATA GATHERING METHOD

[75] Inventor: Roger S. Vickers, Los Altos, Calif.
[73] Assignee: SRI International, Menlo Park, Calif.

[21] Appl. No.: 342,819
[22] Filed: Jan. 26, 1982
[51] Int. Cl.³ .............. G01S 9/02
[52] U.S. Cl. .............. 343/5 CM; 364/449; 364/460; 343/5 R
[58] Field of Search .............. 364/433, 434, 449, 450, 364/454, 460; 343/5 DP, 5 MM, 7 TA, 5 CM; 340/27 NA

[56] References Cited

U.S. PATENT DOCUMENTS

| | | | |
|---|---|---|---|
| 3,614,778 | 10/1971 | Graham et al. | 343/5 CM |
| 4,050,067 | 9/1977 | Elmore, Jr. | 343/5 R |
| 4,144,571 | 3/1979 | Webber | 343/7 TA |
| 4,224,669 | 9/1980 | Brame | 364/460 |
| 4,359,732 | 11/1982 | Martin | 343/5 CM |

*Primary Examiner*—Felix D. Gruber
*Assistant Examiner*—Karl Huang
*Attorney, Agent, or Firm*—Thomas H. Olson; Urban H. Faubion

[57] ABSTRACT

A system for gathering topographic data for use in computer generation of topographic maps of various forms. This system includes equipment mounted in an aircraft which can be flown over a terrain area which is to be surveyed. The equipment comprises a low frequency radar which is capable of penetrating foliage in the survey area for generating a signal representative of the distance from the aircraft to the terrain surface, a precision altimeter that produces a signal representative of the altitude of the aircraft with respect to a reference plane such as sea level, temperature and humidity sensors for producing signals representative of those quantities, a clock for producing a signal representative of a standard time, and a digital recorder for recording the previously named signals which are produced during over flight of a survey area. The recorder has a recording medium which can be removed from the aircraft and employed at a remote time and place as computer input for effecting generation of topographic maps showing various characteristics of the survey area. Concurrent with the gathering of data in the aircraft, data representative of temperature and humidity at the surface of the survey area are gathered and recorded on a second recording medium. The two recording media can be combined at a remote time and place as computer input to produce highly accurate topographic maps.

The system can include a second radar operating at a different frequency from that at which the first mentioned radar operates. One of the radars can accurately penetrate the foliage and the other can measure the distance from the aircraft to the foliage surface so that information concerning the foliage can be generated. The system also includes circuitry for responding to surface water in the survey area so that accurate mapping of rivers, lakes, streams and swamps can be achieved.

3 Claims, 7 Drawing Figures

TOPOGRAPHIC DATA GATHERING METHOD

BACKGROUND OF THE INVENTION

1. Field of the Invention

This invention relates to apparatus for gathering data from which a topographic map can be generated, and more particularly to gathering data with respect to terrain that is covered with foliage by traversing such terrain with an aircraft equipped with data gathering apparatus.

2. Description of the Prior Art

U.S. Pat. No. 4,050,067 discloses an airborne microwave path modeling system in which radar equipment is flown between two microwave towers, and data indicative of the terrain profile between the towers is stored and plotted. Simultaneously with storage of the radar data, information concerning the altitude of the plane and ambient barometric pressure, humidity and temperature is recorded to afford calculation of atmospheric absorbtion so that a corrected plot of the microwave reflectivity of the terrain can be generated.

U.S. Pat. No. 2,845,620 discloses an aerial mapping and profiling system in which a microwave reflector is swept on a path transverse to the direction of travel over the surface of the earth. The output of each sweep is recorded photographically, and the system includes a plan position indicator which cooperates with two or more ground based stations to produce signals indicating the position of the microwave reflector over the earth surface. The position signals are recorded on film.

U.S. Pat. No. 4,101,891 discloses a surface roughness measuring system in which an aircraft mounted radar system is flown over ocean waves or rough terrain to determine the roughness thereof. The data acquired by the system is recorded on film.

U.S. Pat. No. 3,727,219 discloses an interferometer null multiplication technique and apparatus having a pair of airborne receiving antennas and a film for recording the signals received by the antennas in seperable form. The recorded signals interfere with one another at a null which is representative of the angle between a radar beam and the surface of the terrain over which the antennas are flown.

U.S. Pat. No. 3,680,086 discloses a ground mapping radar system having an airborne directionally scanning ranging system which creates a display. The system also includes a navigation system and a vehicle motion compensator which are applied to the display to compensate for aircraft movement.

U.S. Pat. No. 3,213,415 discloses an airborne contour-sensing radar employing a high frequency radar signal for sensing differences in height and reflectivity of objects over which the radar is flown. The radar data obtained by the system is reproduced on a display in the aircraft.

In a paper titled "High Resolution Measurements of Snowpacked Stratigraphy Using a Short Radar Pulse" by Vickers and Rose, Proceedings of the Eighth International Symposium on Remote Sensing of Environment, October 1972, Ann Arbor, Mich., there is described measurements of the thickness and the density of a snowpack by use of radar waves directed at the snowpack from an antenna supported on a ground surface traversing vehicle. The paper reports on the correlation between dielectric losses in the snow and frequency from a range of $10^3$ to $10^{10}$ Hz.

A paper entitled "Radio Echo Sounding of Temperate Glaciers at Frequencies of 1 to 5 MHz" by Watts et al. presented at the Symposium of Remote Sensing in Glaciology at Cambridge, England, September 1974, describes a vehicle mounted radar system which can traverse a glacier and produce data indicative of the thickness of the glacier.

SUMMARY OF THE INVENTION

In accordance with the present invention data is acquired from equipment that is installed in an aircraft which is flown over terrain. The acquired data is stored on a magnetic tape so that subsequent computer processing of the tape produces a topographical map which can indicate the contour of the ground surface and/or the contour of the top of foliage covering the ground surface.

The equipment mounted in the aircraft includes a radar which is operated at a frequency low enough to penetrate foliage and produce a return from the hard ground surface. Also included among the equipment that is provided in practicing the invention is a precision position locating system which produces recurrent or continuous signals that indicate the coordinate location of the aircraft with respect to the terrain surface. Such signals are recorded simultaneous with radar return signals. Additionally, there is a precision altimeter system carried in the aircraft. The altimeter system produces a signal indicative of the altitude of the aircraft with respect to some reference plane (e.g., sea level), and contains equipment for producing signals indicative of outside air temperature and humidity, vertical acceleration of the aircraft and standard time. Finally, there is additional equipment on the ground in the survey area for producing signals indicative of surface barometric pressure, surface temperature and time. These signals are recorded on a recording medium so that the recording medium contains all information needed for a computer generated topographic map of the terrain in the survey area.

There can be mounted in the aircraft a second radar which is operated at a higher frequency so that the second radar produces a primary return from the top of the foliage and a secondary return from the terrain surface. Because the second radar operates at a higher frequency than the first radar, the secondary return from the second radar can be used in conjunction with the return of the first radar to produce a more accurate indication of the distance between the aircraft and the terrain surface.

An object of the invention is to provide a method and apparatus for affording generation of accurate topographical maps of inaccessible foliage covered terrain. This object is achieved because equipment for gathering and storing all parameters needed for a topographical map is carried in an aircraft, but computer generated topographic maps are produced on ground based equipment at a later time. Because the system is designed to accommodate an aircraft speed of about 200 knots, data for mapping substantial areas of terrain surface can be gathered in a very short time.

Another object of the invention is to provide a system of the class referred to previously that affords derivation of the amount of timber available from foliage growing on terrain. By the use of two radars operating at different frequencies data concerning both the profile of the terrain surface and the profile of the upper foliage surface can be derived. The difference between these two profiles produces the height of the foliage and from such height an estimate of the usable timber in the foliage can be produced.

Still another object of the invention is to provide a system in which rivers, lakes, swamps and other waterways can be accurately located even though the same may be covered with foliage. This object is achieved by exploiting the known phenomenon that a water surface is an excellent reflector of radar signals, by providing equipment in the aircraft for measuring the amplitude of the return signals and by producing a flag signal when the return exceeds a preselected amplitude which indicates the presence of water. Accordingly, the completed computer generated map includes accurate information as to the location of water on the terrain surface.

The foregoing together with other objects, features and advantages will be more apparent after referring to the following specifications and the accompanying drawings.

DESCRIPTION OF THE PREFERRED EMBODIMENT

Figure 1:
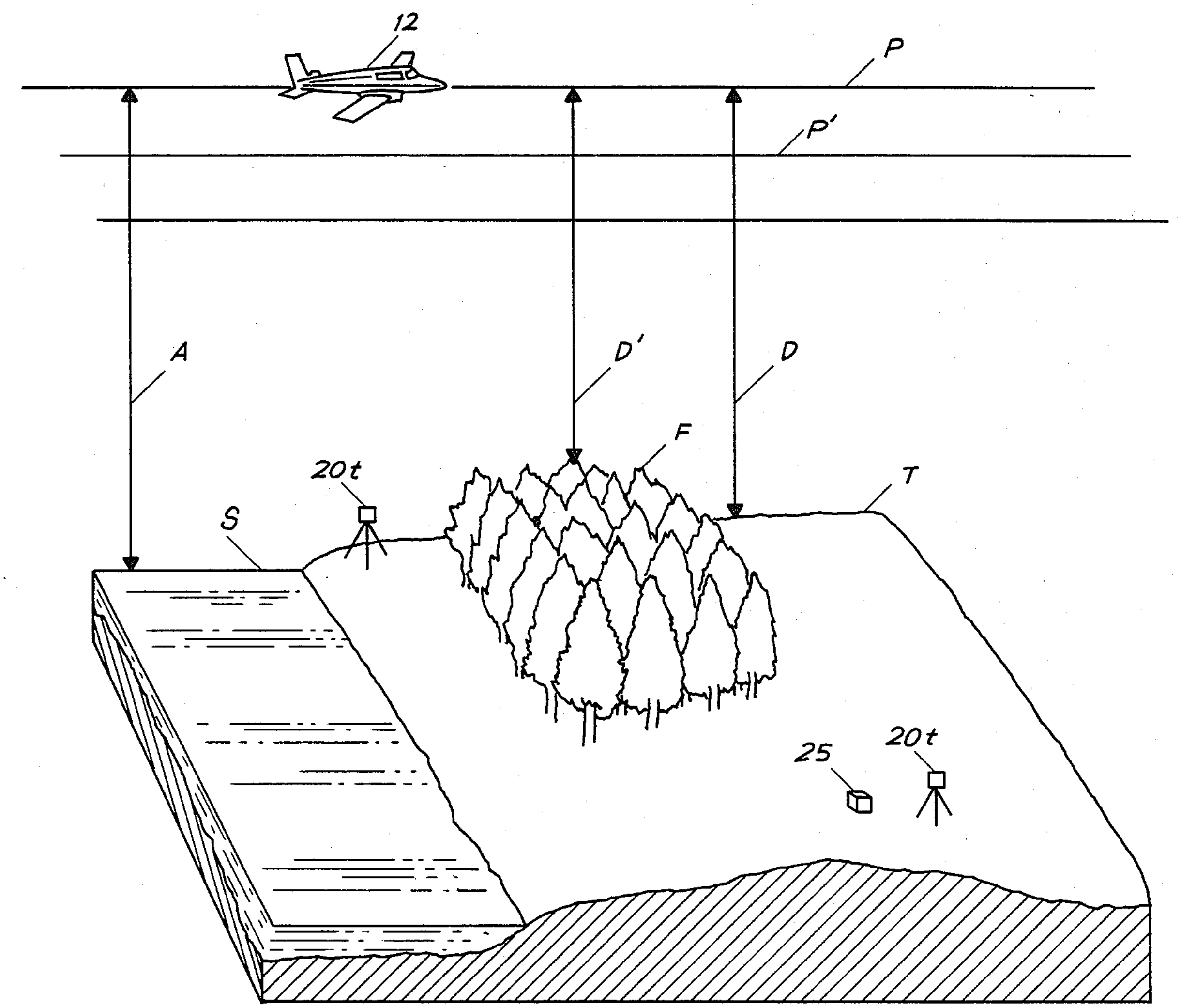
FIG. 1 is a pictorial view showing a typical environment in which practice of the invention is particularly suitable.

Referring more particularly to the drawings, reference numeral 12 indicates an aircraft during traversal of a path P over terrain T that is covered by foliage F. Mounted within aircraft 12 are numerous pieces of equipment used in practicing the present invention, one such piece of equipment being a precision altimeter 13 (see FIG. 3) which produces a digital output signal indicative of the altitude A of path P with respect to a reference level such as sea level S. Aircraft 12 is also equipped with one or more radars which produce a signal indicative of the distance D from the aircraft to the surface of terrain T and a signal indicative of the distance D′ from the aircraft to the surface of foliage F. Thus the level of the surface of terrain T with respect to sea level S, can be ascertained by subtracting distance D from altitude A.

Figure 2:
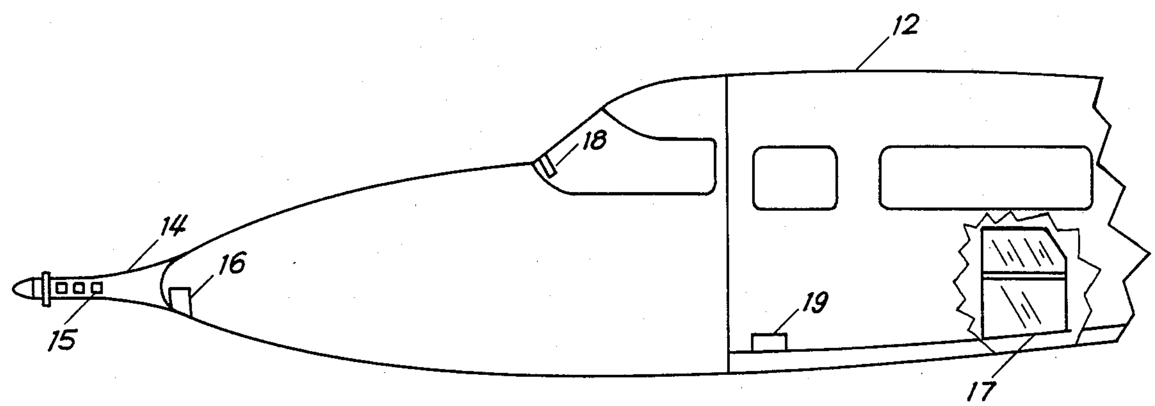
FIG. 2 is a fragmentary side view of an aircraft equipped to practice the invention.

FIG. 2 includes a diagramatic representation of certain elements of the data gathering system. Aircraft 12 is equipped with a swivel nose probe 14 which aligns with the airstream flowing over the aircraft during flight. Mounted within nose probe 14 are transducers or sensors 15 for sensing ambient pressure, humidity and temperature characteristics. Carried within the hull of the aircraft adjacent nose probe 14 is an electronics pack 16 which cooperates with sensors 15 to produce signals representative of the magnitude of the ambient characteristics. Such signals are fed to an on board computer 17 which processes the information in a manner described hereinafter and drives a display 18 for the pilot. Also included as an element of the precision altimeter 13 is an accelerometer 19, which responds to rapid variations in altitude , as might occur in turbulent conditions, so that the altitude signal produced is precise at all times.

Figure 3:
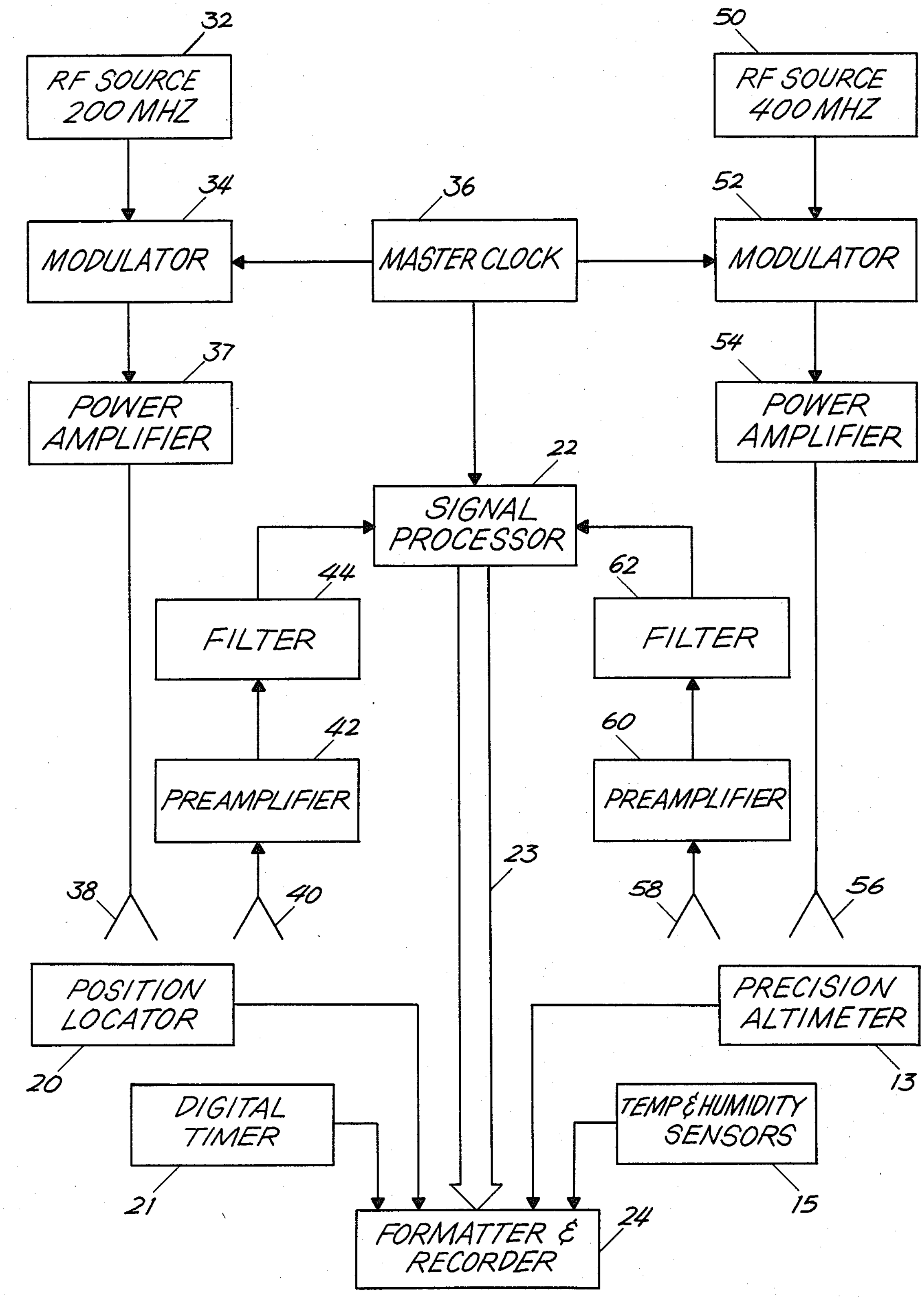
FIG. 3 is an over all block diagram of a system embodying the invention.

Referring to FIG. 3, the equipment within the aircraft 12 includes a position locator 20 which coacts with two or more ground based towers, such as are shown at **20*t* in FIG. 1, to produce signals that are representative of the coordinate location of aircraft 12. One commercially available coordinate position locator that is suitable for use in practicing the invention is marketed under the trade designation "Flying Flagman" by Del Norte Technology, Inc. of Euless, Tex. The equipment typically includes two or more ground based tower supported transponders which respond to a signal produced by equipment within aircraft 12** to produce signals representative of the coordinate location of the aircraft.

The equipment within aicarft 12 also includes a digital timer 21 which produces a digital output representative of real or standard time. There is also a signal processor 22 (explained in more detail hereinafter) which produces outputs representative of distances D and D′. The outputs of altimeter 13, position locator 20, temperature and humidity sensors 15, digital timer 21 and radar signal processor 22 are coupled via a bus 23 to a tape recorder 24 which contains a magnetic medium on which all signals are simultaneously recorded during traversal by aicarft 12 of path P.

The data gathering system includes ground based equipment 25 (FIG. 1) that is placed on the terrain surface in the survey area for measuring surface pressure and temperature and for recording those quantities along with a standard time signal on a magnetic medium that constitutes a part of the ground based equipment. The data on the latter magnetic medium and the data on the magnetic medium recorded in aircraft 12 during overflight of the survey area are processed by a ground based computer, not shown, to compute a very precise altitude signal that is useful in generating accurate topographical maps. The ground based computer solves the following formula:

$$z = \frac{T_s}{\beta_o}\left(1 - \left(\frac{p}{p_s}\right)^{\frac{R\beta}{g}}\right)$$

In the above formula:

- z = altitude
- $T_s$ = surface temperature (calculated from air temperature and lapse rate)
- $\beta_o$ = lapse rate (assumed standard value of 0.0065° K./m)
- p = barometric pressure
- $p_5$ = surface pressure (measured independently of aircraft system)
- R = gas constant (calculated from humidity measurement)
- g = acceleration due to gravity.

The accelerometer 19 provides a signal which is used to correct for short-term variations in altitude that are too fast to be compensated by the other devices in FIG. 2.

Because signals with frequencies less than 2 Hz can be adequately corrected by the atmospheric measurements, the accelerometer signal is used only for compensating for variations in altitude arising from turbulence during the survey.

Figure 6:
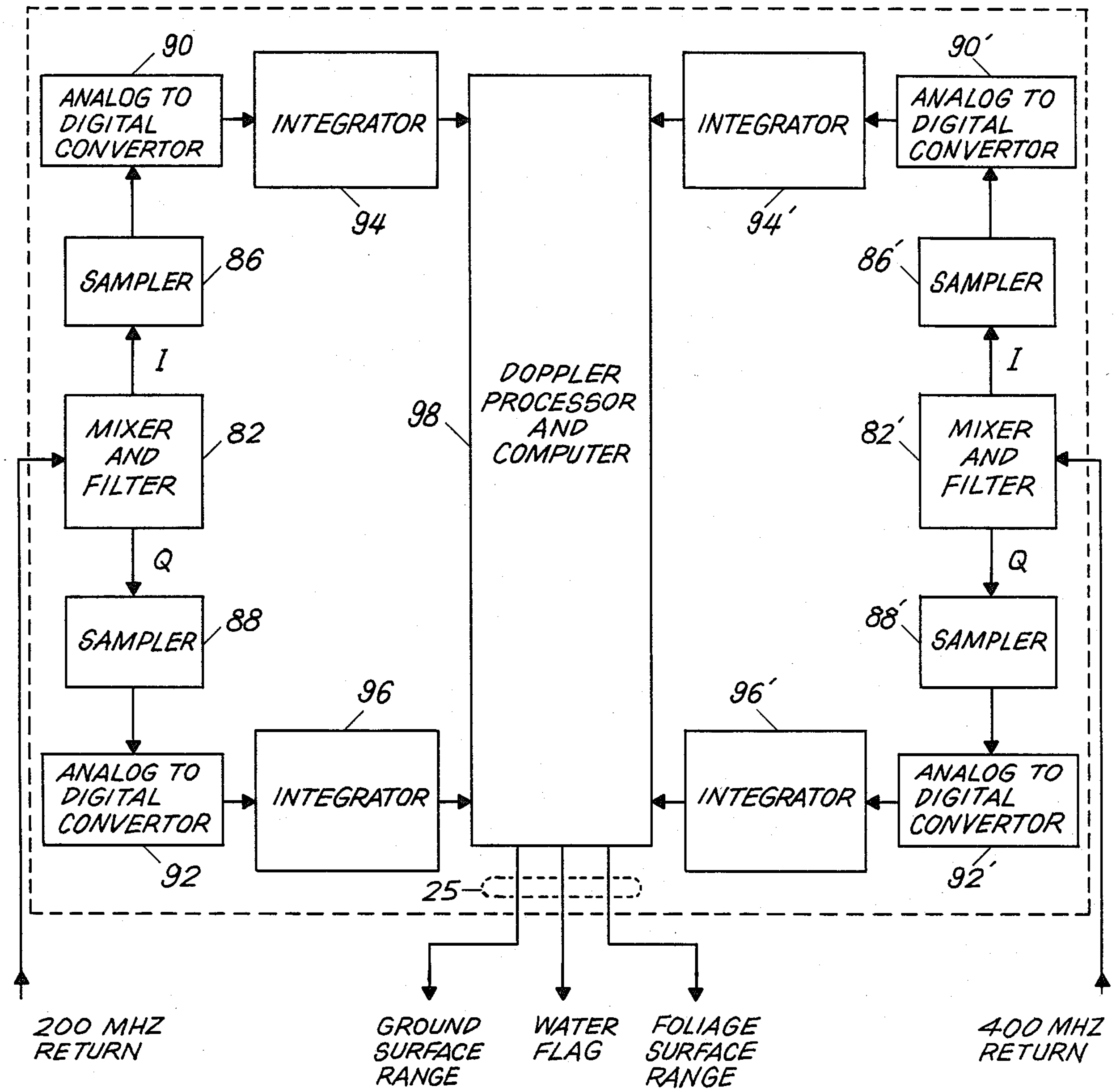
FIG. 6 is a block diagram of a signal processor used in practicing the invention.

Two radar systems are provided in aircraft 12. The radar systems operate at different frequencies but are otherwise substantially identical. There is a first RF source 32 which produces a continuous carrier wave at a relatively low frequency, for example, a frequency of about 200 MHz. The carrier wave produced by RF source 32 is applied to a modulator 34 which produces pulses no longer than about two cycles of the carrier wave. Such pulses are produced under the control of a master clock 36 so that the duration between two successive pulses is sufficient for the return signal to be received and processed before a subsequent pulse is produced. The pulses produced by modulator 34 are amplified by power amplifier 37 which drives a transmitting antenna 38 which is directed downward from aircraft 12 toward terrain T. There is a receiving antenna 40 similarly mounted in aircraft 12 so as to receive the returns of the signals transmitted by transmitting antenna 38. The return signals received by receiving antenna 40 are amplified by a preamplifier 42 the output of which is applied to a filter network 44. Filter network 44 can be a bandpass filter having a center frequency corresponding to that of RF source 32 so as to eliminate noise and other extraneous matter from the received signal. The output of filter network 44 is connected to signal processor 22 which produces a distance signal representative of the distance from aircraft 12 to the surface of terrain T. It is the latter signal that is recorded on tape recorder 24 via a bus 25 with the other signals previously described. Certain details of signal processor 22 are described in more detail hereinafter in connection with FIG. 6.

A second radar system is also mounted in aircraft 12. It includes an RF source 50 which produces a carrier wave at a relatively high frequency, for example, 400 MHz. Such continuous wave signal is applied to a modulator 52 in which a pulse having a length of no more than about two cycles is formed in a manner described previously in connection with modulator 34. The pulse is amplified by a power amplifier 54 and applied to a second transmitting antenna 56. Antenna 56 is mounted in aircraft 12 so that the energy transmitted therefrom is directed toward terrain T and foliage surface F. Also mounted in aircraft 12 in a position to receive the returns transmitted by antenna 56, is a receiving antenna 58. Circuitry associated with receiving antenna 58 is substantially identical to that associated with receiving antenna 40, there being a preamplifier 60 and a filter network 62. Filter network 62 is a bandpass filter centered at the frequency of the signal produced by RF source 50. The output of network 62 is connected to signal processor 22.

Figure 4:
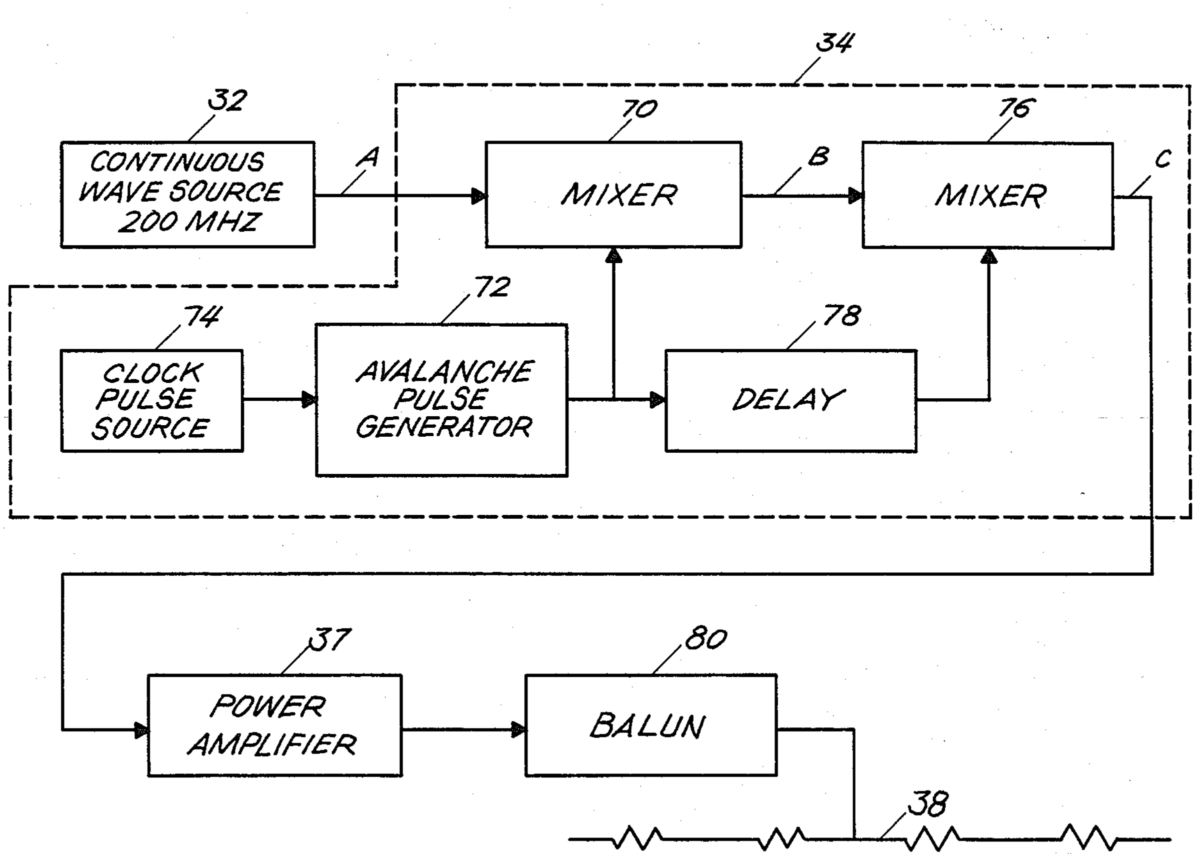
FIG. 4 is a block diagram of an exemplary radar transmitter employed in practicing the invention.
Figure 5:
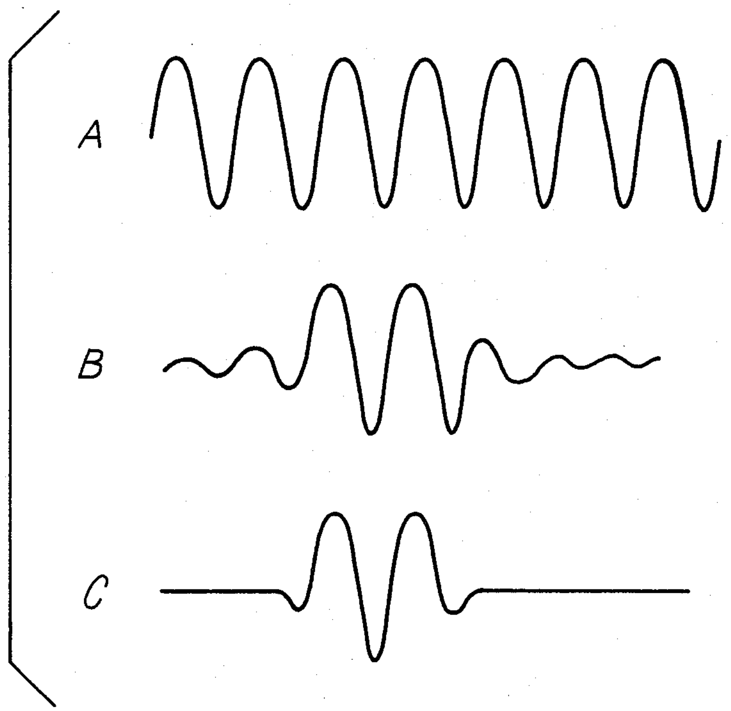
FIG. 5 is a plot of time versus relative signal strength for certain circuit points in FIG. 4.

In order to achieve good accuracy in the measurement of distance from the aircraft to the terrain surface and/or the foliage surface, it is desirable that each radar pulse contain only one or two cycles of the radio frequency employed. Modulators 34 and 52 are constructed to achieve this. Modulator 34 is exemplary and is shown in greater detail in FIG. 4, which will be described in conjunction with the plot of FIG. 5. Modulator 34 includes a mixer 70 which has as one of its inputs the continuous wave RF signal from RF source 32. The other input to mixer 70 is constituted by the output of an avalanche pulse generator 72 which is driven by a clock pulse from a clock pulse source 74 that constitutes a part of master clock 36. An exemplary clock rate of the pulses produced by clock pulse source 74 is one hundred KHz. This clock frequency gives ample time between adjacent clock pulses for return of the radar pulse from the target. In response to receipt of a clock pulse, avalanche pulse generator 72 produces a very short pulse which has extremely fast rise and fall times so that no more than about two cycles from RF source 32 are passed by mixer 70. The output of mixer 70 is applied to a second mixer 76 which has a second input from delay 78 which delays the trigger pulse produced by avalanche pulse generator 72. As can be seen in FIG. 5, the output B of mixer 70 contains approximately two cycles preceded and followed by leakage signals whereas the output C of mixer 76 contains two cycles and is devoid of leakage signals. Accordingly, good resolution and accuracy of the distance measurement from aircraft 12 to the target is achieved.

The output of mixer 76 is connected to power amplifier 37, the output of which is connected to antenna 38 through a balun so that the unbalanced output of the pulse amplifier can drive the balanced input of the antenna. Antenna 38 is shown as a resistively loaded dipole antenna in the exemplary circuit of FIG. 4. The resistive loading in these antennas follows the law $$Z^i(z) = \frac{60\Psi}{h - |z|} \text{ ohm/m}$$

where $Z^i$ is the impedance at a point Z from the feed h is the half length of the antenna $\Psi$ is a constant dependent on antenna geometry (for the antenna used in this disclosure, $\Psi = 0.25$ and $h = 0.3$).

Thus the radar signal produced has a sufficiently low frequency to penetrate to the terrain surface but is sufficiently short to produce an accurate, high resolution return.

Figure 7:
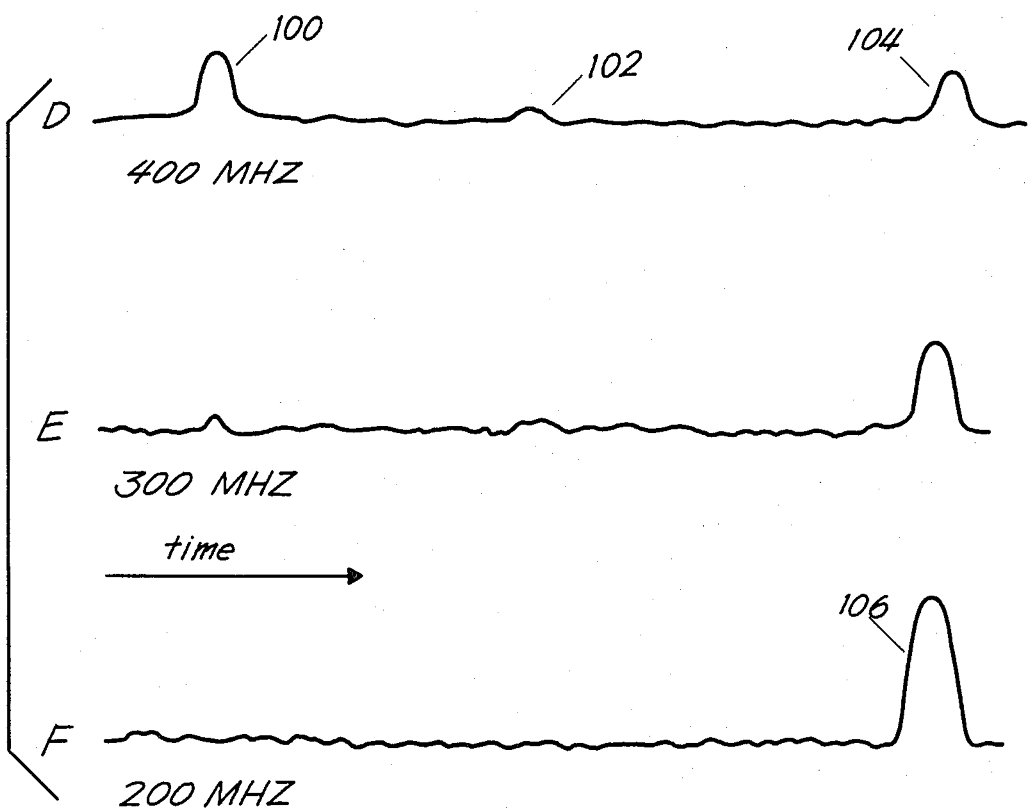
FIG. 7 is a plot of distance versus relative signal strength of exemplary radar return signals at different frequencies.

The returns are processed by signal processor 22 which produces data in a form suitable for recordation on recorder 24. Certain details of signal processor 22 are shown in the block diagram of FIG. 6. The operation of the elements in FIG. 6 will be described with reference to the plots of FIG. 7.

The low frequency radar return from filter 44 is coupled to a mixer and filter 82, and the high frequency radar return from filter 62 is coupled to mixer and filter 82'. Because the elements in processor 22 for processing the high frequency return and the low frequency return are substantially identical, the ensuing description employs various reference numerals to identify circuit elements that process the 200 MHz return signal and employs the same reference numerals with the addition of a prime to identify corresponding elements that process the 400 MHz return signal. Mixer and filters 82 and 82' function to split the radar return signal into an inphase component I and a quadrature component Q. The I component produced by mixer 82 is connected to a sampler 86 and the Q component is connected to a sampler 88. The samplers function to sense portions of the received radar signal during which a ground or foliage return is expected by dividing the analog return signal into a succession of pulses each of which has an amplitude corresponding to the amplitude of the return at the time of the sampling pulse. The sequences of pulses formed by the samplers are digitized, there being an analog to digital convertor 90 coupled to sampler 86 and an analog to digital convertor 92 coupled to sampler 88.

The outputs of convertors 90 and 92 are a series of digital signals each of which represents the magnitude at one sample interval; each group of such digital signals represents the return from one transmitted pulse. In order to reduce the rate at which range data is presented and to reduce the effect of anomalies in the data, the outputs of the analog to digital convertors 90 and 92 are connected to respective integrators 94 and 96 the outputs of which represent a digitized version of the average of plural return pulses. The signals produced by integraters 94 and 96 are connected to a Doppler processor and computer 98. Also coupled to computer 98 are equivalent signals for the 400 MHz radar return, there being samplers, analog to digital convertors and integraters corresponding to those specifically referred to previously.

Doppler processor and computer 98 performs numerous functions. Because none of the functions is novel per se they will be described only briefly herein. Doppler processor and computer 98 subjects the four incoming digital signals that are representative of the I and Q portions of the return signal to Doppler processing, which is described in U.S. Pat. No. 3,737,900. Doppler processing of the signals has the effect of reducing the target area in a direction of aircraft traverse so that each return has good accuracy notwithstanding sloped terrain below the aircraft.

Additionally Doppler processor and computer 98 produces a flag when the radar is returned from a water surface. This is detected within the computer by sensing the amplitude of the return pulse and by producing a flag when the amplitude exceeds some preselected value. This is possible because a radar return from a water surface has a much greater amplitude than the radar return from other surfaces such as foliage or terrain.

Finally the computer combines the I and Q signals of the high and low frequency returns to produce a ground return signal and to produce a foliage return signal, if any. It has been found that the low frequency signal (e.g. 200 MHz) reliably penetrates the foliage and produces a good ground return. Because of the relatively low frequency, however, the resolution or accuracy of the low frequency signal is limited. In contrast, relatively high frequency signal (e.g. 400 MHz) cannot reliably penetrate foliage, but when it does, the return signal produced has far better resolution or accuracy. Doppler processor and computer 98 combines the returns so as to provide a ground return which is reliable because of the presence of the relatively low frequency return but which has enhanced resolution or accuracy when a relatively high frequency return is sensed from the terrain surface.

The outputs of the signals described hereinabove are applied to individual signal paths on bus 23 which, as seen in FIG. 3, is connected to data recorder 24. A better understanding of the operation of processor 22 can be had by reference to the curves of FIG. 7. The curve D represents the analog of the radar return from the 400 MHz radar signal applied to mixer and filter 82' and curve F represents the analog return from the 200 MHz radar applied to mixer and filter 82. Curve E was experimentally derived from a 300 MHz return signal and illustrates the correlation between penetration of foliage and frequency. Referring first to curve D, there is a return pulse 100 from the top surface of the foliage, that is, from the tip of trees or the like. Because of the relatively high frequency of the carrier from which curve D was derived, there is significant return as indicated by pulse 100. Next there is a slight return pulse 102 from a lower foliage layer which in certain forests can be formed by underbrush having a surface above the ground surface but below the tree top surface. Finally, there is a ground return pulse 104 which shows that the 400 MHz signal has at least partially penetrated the foliage. The radar return after the ground return is of no interest and therefore is not shown.

Curve F, representing the return from the relatively low frequency, shows little if any return from the tree top surface, any return being virtually indistinguishable from noise. This is because the relatively low frequency almost completely penetrates the foliage. In addition there is virtually no return from the underbrush. There is, however, a substantial return pulse 106 from the ground surface indicating that the low frequency produces a reliable return from the ground surface. Because the wave length of the signal is relatively large, however, the resolution or accuracy afforded by pulse 106 is less than that afforded by pulse 104. Accordingly, one of the functions performed by Doppler processor and computer 98 is to determine that pulses 104 and 106 are present in the same range and then to utilize relatively high frequency pulse 104 as a more accurate ground return. In those cases where no signal 104 is present, Doppler processor and computer 98 utilizes the position of pulse 106 in deriving a digital signal representative of the distance to the terrain surface for recordation by tape recorder 24.

Ground return pulses 104 and 106 are representative of the magnitude of the return signal from a relatively dry surface. When the surface is covered with water, such as a swamp, lake or stream, the magnitude of the return signal is substantially higher. Doppler processor and computer 98 includes circuitry for detecting return signals of a magnitude greater than a prescribed threshold and on detecting such produces a flag signal which is recorded by tape recorder 24.

In practicing the invention to gather topographic data for an area, two or more towers 20*t* (FIG. 1) are installed at strategic locations within or adjacent to the area so as to enable position locator 16 to generate coordinate position signals for recordation by recorder 24. Aircraft 12 is then flown along path P above the area, an altitude of about 1000 feet and a speed of about 200 knots being suitable. As the aircraft traverses path P the radar or radars operating in conjunction with processor 22 produce distance signals at intervals of approximately one meter along path P. Those signals are recorded by recorder 24 along with the coordinate location signals produced by position locator 20, an altitude signal produced by precision altimeter 13, temperature and humidity signals from sensors 15 and the time of recordation by digital timer 21. After path P is traversed aircraft 12 is caused to traverse an approximately parallel path P' which can be spaced from path P by about 10 meters. When the surface area has been traversed as described above, the magnetic medium in recorder 24 contains data from which virtually all information concerning the terrain can be derived. Because the signals are few in number and because of excellent high density tape recorders that are commercially available, data gathered during five or more hours of flying time can be recorded on a single tape. Actual computer generation of a map can take place at any suitable remote location and time.

The data gathered as described above can be processed in numerous ways depending on the user's wishes. For example, in forested terrain a map of foliage or tree height can be produced and from this, one with knowledge the nature of the foliage can produce a good estimate of the amount of timber that can be harvested from the area. In addition, some oil-related geologic features which result in subtle topographic variations can be located with this system. One desirous of knowledge of waterways within the area can obtain pertinent information by utilizing, among other things, the flag signal produced by signal processor 22 and recorded by recorder 24. Any number of other topographical maps can be generated, or regenerated, because the data is in permanent form on the media from recorder 24 and ground base equipment 25.

Thus it will be seen that the present invention provides a system for rapidly gathering data useful for generating topographical maps and the like. Because the data are recorded in real time in recorder 24 in a permanent manner, the aircraft need carry no complex, heavy computer equipment thereby reducing the size of the aircraft and the number of personnel needed. Finally in those cases where two radars are used as exemplified in FIG. 3, data concerning both the terrain surface and the foliage characteristics can be obtained. Although one embodiment of the invention has been shown and described it will be obvious that other adaptations and modifications can be made without departing from the true spirit and scope of the invention.

What is claimed is:

1. A method for acquiring data for use in producing a computer generated topographic map of terrain comprising the steps of providing a radar, transporting a radar along a path above the terrain to generate plural distance signals indicative of the distance from the radar to the terrain surface at spaced apart points along the path, producing during said transporting step plural location coordinate signals representative of the locations of the points, generating during said transporting step plural altitude signals representative of the altitude of the radar at the points with respect to a reference plane, producing a continuous series of timing pulses recurring at preselected time intervals for affording correlation with the points along the path, simultaneously recording said distance signals, said coordinate signals, said altitude signals and timing pulses in real time on a recording medium, so that the signals recorded on the recording medium and the ground temperature and pressure signals can be inputted to a computer in time correlation for generation thereby of a topographic map.

2. A method of acquiring data for use in producing a computer generated topographic map of foliage covered terrain comprising the steps of providing a first radar operating at a first frequency low enough to penetrate the foliage and produce a return from the ground surface beneath the foliage, providing a second radar operating at a second frequency higher than the first frequency to produce a return from the surface of the foliage, transporting the first and second radars along a path above the terrain to generate a plurality of first signals indicative of the distance from the radars to the ground surface and a plurality of second signals representative of the distance from the radars to the foliage surface, producing during said transporting step plural location coordinate signals representative of the location of the radars along the path, generating during said transporting step a plurality of altitude signals representative of the altitude of the radars with respect to a reference plane, sensing the amplitude of the returns produced by the radars, producing a flag signal when the amplitude exceeds a preselected level that is indicative of a water surface on the terrain, and simultaneously recording said first, second, coordinate and altitude signals in real time on a recording medium so that the signals recorded on the recording medium can be imputted to a computer for generation thereby of a topographic map.

3. A method for acquiring data for use in producing a computer generated topographic map of foliage covered terrain comprising the steps of overflying the terrain along a flight path, directing at the terrain while traversing the flight path a first radar pulse at a first frequency and a second radar pulse at a second frequency that is greater than the first frequency so as to produce a plurality of first signals representative of the distance from points along the flight path to the terrain surface and a plurality of second signals representative of the distance from points along the flight path to the foliage surface, measuring the distance of the points along the flight path above a preselected reference plane to derive plural altitude signals, generating location coordinate signals representative of the location of the points along the flight path relative to the terrain, producing a continuous series of timing pulses recurring at preselected time intervals for affording correlation with the points along the path, simultaneously recording the first, second, altitude and coordinate signals and timing pulses on a recording medium measuring temperature and pressure on the terrain surface to produce a ground temperature signal and a ground pressure signal, and recording the ground temperature signal and the ground pressure signal with a standard time signal to afford subsequent input of the data on the recording medium and the ground temperature and pressure signals to a computer in time correlation for generation of a topographic map of the terrain.

* * * * *